Figure 1:
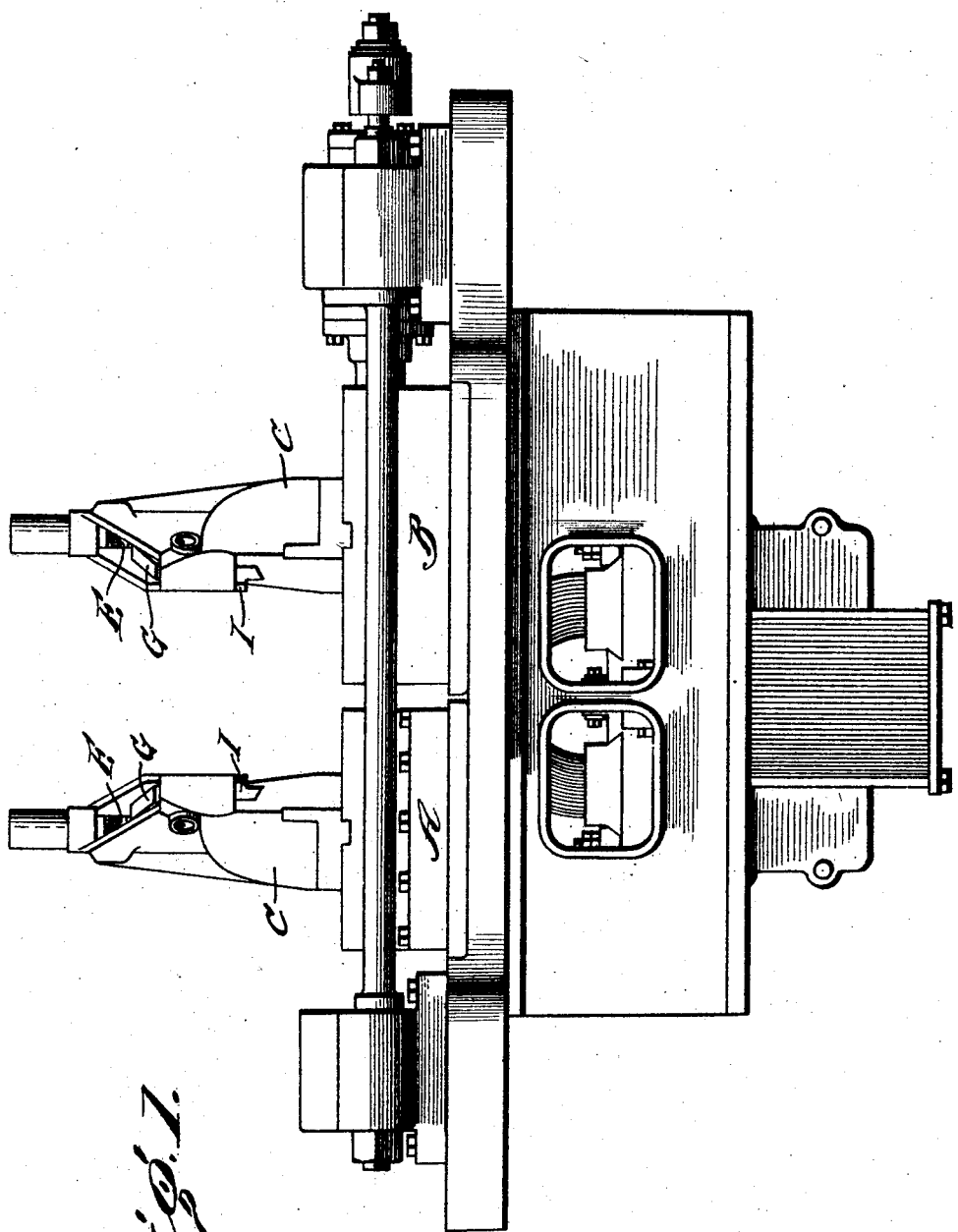

H. W. KRANZ AND J. LUKES.
CLAMP FOR WELDING MACHINE ATTACHMENTS.
APPLICATION FILED MAY 24, 1920.

1,416,839.

Patented May 23, 1922.
4 SHEETS—SHEET 1.

Inventor
H. W. Kranz.
J. Lukes.

By Hull Smith Brock & West
Attorney

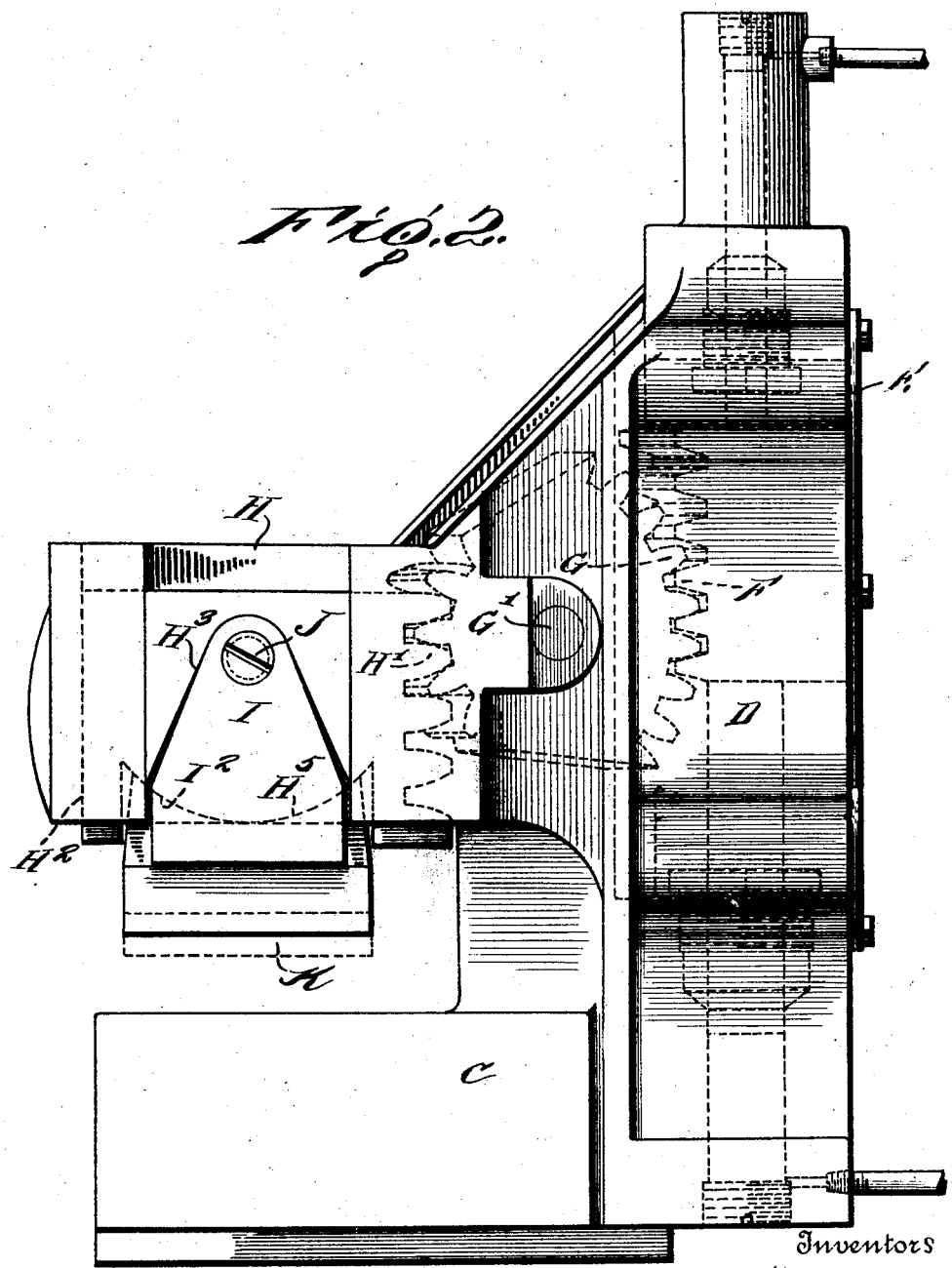

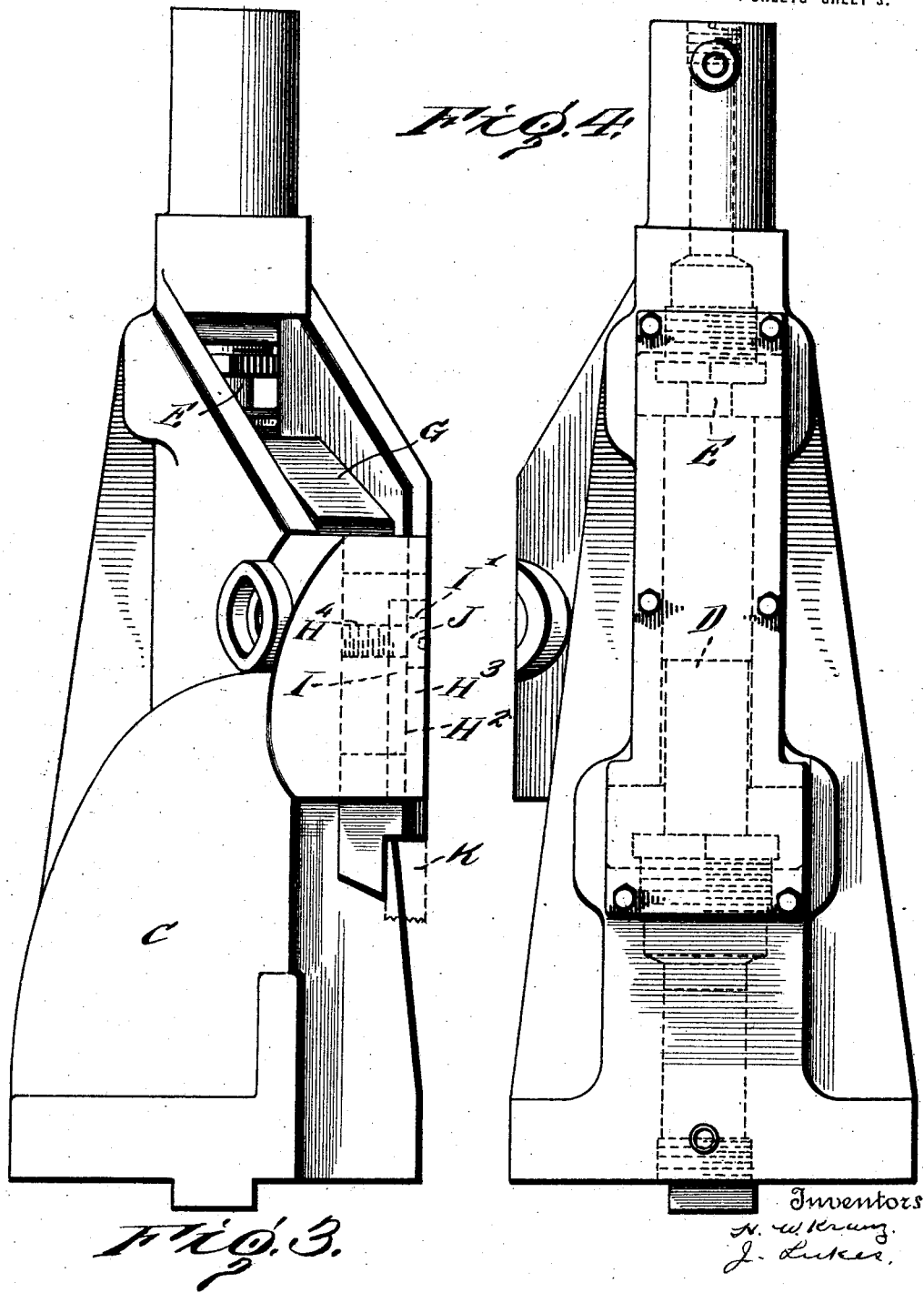

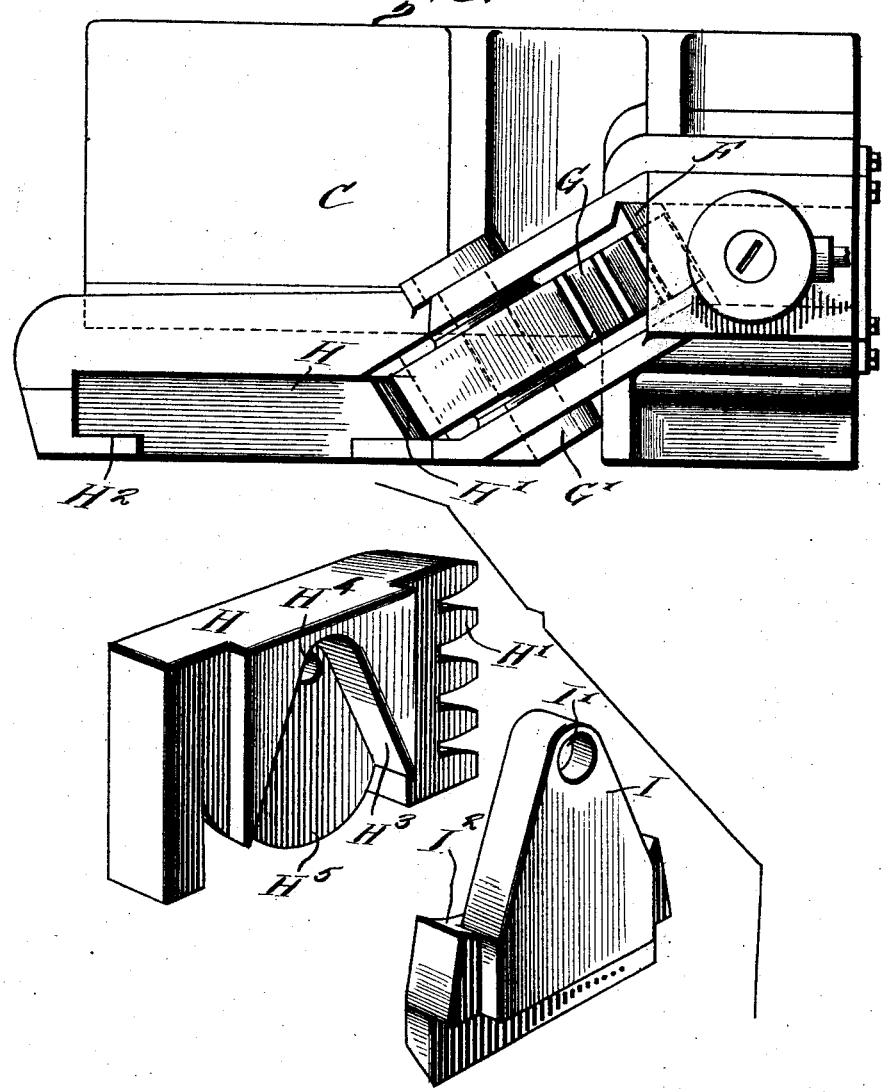

UNITED STATES PATENT OFFICE.

HARRY W. KRANZ AND JOHN LUKES, OF CLEVELAND, OHIO, ASSIGNORS TO THE HYDRAULIC PRESSED STEEL COMPANY, OF CLEVELAND, OHIO, A CORPORATION OF OHIO.

CLAMP FOR WELDING-MACHINE ATTACHMENTS.

1,416,839.  Specification of Letters Patent.  Patented May 23, 1922.

Application filed May 24, 1920. Serial No. 383,700.

*To all whom it may concern:*

Be it known that we, HARRY W. KRANZ and JOHN LUKES, citizens of the United States, residing at Cleveland, in the county of Cuyahoga and State of Ohio, have invented a certain new and useful Improvement in Clamps for Welding-Machine Attachments, of which the following is a full, clear, and exact description, reference being had to the accompanying drawings.

This invention relates generally to electric welding machines employed in welding together the ends of a rolled circular band or rim.

Heretofore the circular band or rim has been placed upon the bed of the welding machine and clamped thereto and this clamping operation has been manually performed, and likewise the releasing of the clamp has been manually accomplished and these manual operations not only require the services of one or more operators but also require considerable time in their accomplishment.

It is therefore with the object of eliminating the manual operations and the saving of time and labor that the present improvements have been devised, and the invention having these objects in view consists in the novel features of the various parts and in the manner of combining and operating the same, as will be more fully described hereinafter and set forth in the appended claims.

In the drawings forming a part of this specification, Fig. 1 is a side elevation of a welding machine embodying our improvements; Fig. 2 is a detail side view of one of the clamps and means for operating the same; Fig. 3 is an end view of the same; Fig. 4 is an end view from the opposite side; Fig. 5 is a top plan view; Fig. 6 is a view showing the clamp proper in detail.

As the welding machine proper and the hydraulic means connected therewith for operating certain portions of said welding machine form no part of our invention, no reference will be made thereto. In this type of welding machine there is usually a fixed portion and a movable portion of the base and these portions we have indicated at A and B, respectively, and attached to each portion in any suitable manner are the oppositely disposed castings C each having fluid operating pistons D and E arranged therein, said fluid operated pistons being either connected to or operating upon a vertically movable rack F which meshes with a mutilated gear G journaled within the casting upon an axis G', said mutilated gear having one set of teeth which mesh with the rack F and another set of teeth which mesh with the toothed edge H' of the clamp H which works vertically up and down in the guide way H² of the casting. The outer face of the reciprocating clamp H has a V-shaped recess H³ cut therein and an aperture H⁴ in the apex thereof, and a V-shaped block I having an opening I' through which the pivot J passes is arranged in the V-shaped recess of the clamp H, and it will be noted that the edge of the central portion is curved on the arc of a circle as indicated at H⁵ and the block I is enlarged at its lower end and this enlarged portion is cut away on the same arc as indicated at I², thereby permitting a limited swinging movement of the block within the clamp H inasmuch as sufficient clearance is provided to permit such movement, this clearance and movement being provided to permit the block I to firmly seat upon the rim in case any irregularities should be present. It will be understood that a removable face K is attached to the shouldered face of the block I in any suitable manner.

It will be noted that the teeth of the rack F are cut at an oblique angle and likewise those of the clamp H thereby permitting mutilated gear to be arranged at an angle and bring the clamp in the proper position for engaging the rim. As before stated there are two castings C one on the movable and the other on the fixed portion of the welding machine base, and these castings and connected parts are duplicates of each other oppositely disposed and operating in unison, and in order to so operate them it is only necessary to apply fluid pressure to the proper side of the piston and all of the operations will be carried out, thereby completely eliminating the manual operations which have heretofore been a time consuming feature in the welding operation. When the rack F is moved upwardly by hydraulic pressure, clamp H is moved downwardly as previously described and any irregularity in the stock or base of the machine is compensated for by the tilting movement of the block in the clamp. The casting and all of the parts carried thereby are constructed and arranged in such a manner as to be able to withstand any and all strains placed thereon.

Having thus described our invention, what we claim is:

1. In a machine of the kind described, the combination with the base portions, of the castings connected thereto, a fluid operated rack arranged in each casting, gears meshing with said racks, and clamps operated by said gears all arranged as set forth.

2. In a device of the kind described, a casting having a fluid operated rack arranged therein, a gear pivoted in said casting and meshing with said rack, a clamp movable in said casting and having a portion meshing with said gear.

3. In a device of the kind described, the combination with a casting, of a rack movable therein, a gear carried by said casting and meshing with said rack, a clamp carried by the casting and movable with reference thereto, said clamp having a portion meshing with said gear, and a member pivotally connected to the clamp and capable of a limited vibratory movement with reference thereto.

4. In a device of the kind described, the combination with a clamp, of a gear for reciprocating said clamp, a fluid operated rack for actuating said gear and a support for carrying said clamp, gear, rack and actuating mechanism.

5. In a device of the kind described, a vertically movable clamp having a supplemental member pivotally connected thereto and having a vertical vibratory movement with reference thereto together with means for raising and lowering said clamp.

6. In a device of the kind described, the combination with a clamp, of means for actuating said clamp together with means for moving clamp operating means, said means being arranged in different vertical planes.

7. The combination of a casting, of a clamp slidably arranged therein, a gear arranged at an angle to said clamp and adapted to operate the same, and a fluid operated rack arranged at an angle to the gear and adapted to operate the same as set forth.

In testimony whereof, we hereunto affix our signatures.

HARRY W. KRANZ.
JOHN LUKES.